Patented June 13, 1950

2,511,229

UNITED STATES PATENT OFFICE 2,511,229

PROCESS FOR THE PREPARATION OF CELLULOSE SULFATE

John Cunningham Thomas, Wilmington, Del., assignor to E. I. du Pont de Nemours & Company, Wilmington, Del., a corporation of Delaware No Drawing. Application April 22, 1948, Serial No. 22,712

5 Claims. (Cl. 260—215)

This invention relates to cellulose derivatives and more particularly to cellulose sulfates.

Cellulose sulfates have hitherto been prepared by treatment of cellulosic materials with various sulfating agents such as sulfuric acid, sulfur trioxide, sulfuryl chloride, chlorosulfonic acid, and the like. Because of the serious degrading action of these materials on the cellulose, i. e., the breaking of the cellulose chain into smaller units, these reactions have usually been caried out in the presence of a basic material such as an alkali metal hydroxide or a tertiary amine to reduce the degradation. However, the processes hitherto proposed have been rather complicated or have required the use of extensive reaction times to obtain the desired products. Moreover, the products have usually been of lower molecular weight than desired.

This invention has as an object a simple sulfating process which will rapidly produce a cellulose sulfate of high molecular weight. A further object is the provision of a process for the preparation of low substituted cellulose sulfates, i. e., cellulose sulfates having less than 0.5 combined sulfate group for each glucose unit. Another object is the preparation of low substituted cellulose sulfates which are useful as sizing or treating agents for textiles, and for the preparation of fibers and films. Other objects will appear hereinafter.

These objects are accomplished by the present invention wherein cellulose, preferably fibrous native cellulose, is impregnated with an aqueous solution containing from 10 to 20% by weight of sulfamic acid and from 20 to 60% of a water-soluble amide of a carboxylic acid, and the impregnated cellulose is dried and heated at a temperature of at least 110° C. until a cellulose sulfate is obtained having a degree of polymerization (D. P.) of at least 250.

The term "water-soluble" as applied to the amides of carboxylic acids in this specification means that these amides are sufficiently soluble in water at room temperature to form a solution of at least 20% concentration.

In a preferred way of practicing this invention, air-dry cellulose, e. g., cotton linters, is immersed in an excess of an aqueous solution containing from 10 to 20% of sulfamic acid and from 20 to 60% of an amide of a carboxylic acid, e. g. urea, the ratio of the amide to the sulfamic acid preferably being within the range of 3:1 and 1:1, until the cellulose is uniformly swollen by and impregnated with the solution, 15 to 30 minutes usually being sufficient. The use of aqueous impregnating solutions having a minimum concentration of carboxylic acid amide of 20% is necessary to obtain sufficient swelling, and the concomitant reactivity, of the cellulose. Aqueous solutions containing a minimum of 10% sulfamic acid are required to provide sufficient sulfating agent to produce appreciable degrees of sulfation. The upper limit of concentration of sulfamic acid in the impregnating solution is governed by the solubility of this particular compound in the impregnating solution. In general, the greater the concentration of amide the greater is the swelling of the cellulose; however, from a practical standpoint a maximum of 60% is the maximum useful concentration. The excess solution is then removed by conventional methods such as by filtration under pressure or under vacuum or by centrifuging. This last method is preferable because of the reproducibility of the results obtained. Preferably the amount of solution left in the impregnated cellulose is equal to the dry weight of the cellulose used. However, larger or smaller amounts can be left in the cellulose if desired. Thus amounts of impregnating solution ranging from 50% to 300% of the weight of the cellulose are useful. In general, the greater the amount of the impregnating solution left in the cellulose the greater is the degree of substitution of sulfate groups in the cellulose molecule after the subsequent baking step. The water in the wet impregnated cellulose is then removed by drying at ordinary temperatures in the presence of a desiccant at atmospheric or reduced pressure, or by exposure to a current of dry air at ordinary or moderately elevated temperatures, e. g., at 50–75° C. The resulting dry cellulose impregnated with a mixture of from 5 to 60%, by weight, of sulfamic acid and from 10 to 180% of an amide of a carboxylic acid, is heated at a temperature between 110° and 170° C., preferably at 130–150° C., for a period of time ranging from one minute to one hour or more. Generally, the use of the longer times results in the formation of cellulose sulfates of higher degrees of substitution but of lower molecular weights. Heating times of 10 to 30 minutes are generally preferred since they give products of useful degrees of substitution having at the same time high molecular weights. The preferred time of heating is also dependent on the temperature being employed, the longer times being required for the lower temperatures and the shorter times for the higher temperatures in the above defined range. The heating of the impregnated cellulose can be carried out in an oven or in a current of air heated to the desired temperature, or the impregnated cellulose can be immersed in an inert organic liquid, e. g., a hydrocarbon such as xylene, maintained at the desired temperature.

The cellulosic material used in the practice of this invention can be any of the common types of cellulose such as, for example, cotton linters, wood pulp and regenerated cellulose. Of these the native fibrous celluloses such as cotton linters and wood pulp are especially suitable. Partially substituted organic cellulose derivatives such as, for example, methylcellulose, ethylcellulose, carboxymethylcellulose, hydroxyethylcellulose, cellulose acetate and the like, having at least two free hydroxyl groups for each 6-carbon unit of the cellulose nucleus, can be sulfated by the process of this invention.

The following examples in which parts are by weight are illustrative of the invention.

Example I

Ten and four tenths parts of cotton linters containing 4% moisture are immersed for ½ hour at room temperature in 180 parts of an aqueous solution containing 40% urea and 20% sulfamic acid. The impegnated linters are centrifuged to a wet weight of 20 parts and dried over anhydrous calcium chloride in a vacuum desiccator at room temperature. The impregnated linters, containing two parts of sulfamic acid and four parts of urea, are then heated for 30 minutes in an oven at 135–140° C., after which they are washed thoroughly with distilled water to remove water-soluble materials and finally dried over anhydrous calcium chloride at room temperture in a vacuum desiccator. The product is a white fibrous solid containing 1.97% combined sulfur. This corresponds to a substitution of about 0.11 sulfate group per glucose unit of the cellulose, and represents a yield of about 33%, based on the sulfamic acid used. The product has a degree of polymerization (D. P.) of 490 (calculated from the intrinsic viscosity of a dilute cuprammonium hydroxide solution by Staudinger's equation as discussed in pages 927–929 of "High Polymers, Vol. V, Cellulose and Cellulose Derivatives," Interscience Publishers, Inc., 1943, edited by E. Ott). This product is the ammonium salt of cellulosesulfuric acid produced in accordance with the following equation:

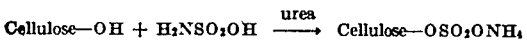

$$\text{Cellulose—OH} + \text{H}_2\text{NSO}_2\text{OH} \xrightarrow{\text{urea}} \text{Cellulose—OSO}_2\text{ONH}_4$$

This product is insoluble in water, 10% aqueous sodium hydroxide at room temperature, acetone, and boiling acetic acid, but it dissolves readily in 10% aqueous sodium hydroxide at −10° C. The solution formed at −10° C. undergoes no change in appearance after standing several days at room temperature.

Example II

Ten and four tenths parts of cotton linters are impregnated with two parts of sulfamic acid and 4 parts of urea by the procedure of Example I. The dry impregnated linters are then immersed in 220 parts of xylene maintained at 140° C. for 30 minutes. The product is filtered from the xylene, washed free of xylene with ethyl alcohol, washed free of excess impregnants with water, and dried in a vacuum desiccator over anhydrous calcium chloride. This product contains 2.16% combined sulfur and has a D. P. of 505. It is also soluble in 10% aqueous sodium hydroxide at −10° C., and the resulting solution is stable at room temperature.

The examples illustrate the process of this invention by the use of urea as the amide of the carboxylic acid used in combination with sulfamic acid. However, other amides of carboxylic acids which are soluble to the extent of at least 20% in water at room temperature can be used. Specific examples of other amides of this type include formamide, acetamide, propionamide, and hydroxyacetamide. Amides of carboxylic acids having 1 to 3 carbon atoms are especially useful in the practice of this invention since they have high solubility in water at ordinary temperatures.

The specific combination of sulfamic acid with an amide of a carboxylic acid is unexpectedly effective for producing cellulose sulfate. The aqueous solutions of the compositions defined above have an exceptional swelling action on the cellulose and readily impregnate uniformly the cellulosic fibers. The degrading action of the sulfamic acid on the cellulosic material is retarded by the amide which also unexpectedly increases the rate of reaction of the sulfamic acid with the cellulose. This unusual and unexpected behavior of the combination of an amide of a carboxylic acid with the sulfamic acid is shown by the following results which were obtained in the reaction of sulfamic acid alone on cellulose. Cotton linters impregnated with a 20% aqueous solution of sulfamic acid alone by the general process described in the examples and heated at 135–140° C. for 30 minutes gave a product which consisted of brown, brittle fibers containing only 1.06% combined sulfur. This corresponds to a substitution of only 0.06 sulfate groups per glucose unit. Similar results were obtained when cotton linters impregnated with 20% sulfamic acid alone were heated at 140° C. in xylene by the method of Example II.

Example II illustrates one embodiment of this invention in which the impregnated cellulose is heated in an inert organic liquid. However, other organic liquids besides xylene can be used as the heating medium. Thus, other aromatic and aliphatic hydrocarbons boiling above 110° C. are suitable. Specific examples of such hydrocarbons which can be used include toluene and the various hydrocarbon fractions boiling above 110° C. obtained from petroleum.

The products of this invention are useful in the same applications that low substituted cellulose sulfates have previously been used, for example, as textile sizes, and for the formation of fibers and films. They are especially valuable for these applications because of their high molecular weight.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of cellulose sulfate which comprises impregnating cotton linters with an equal weight of an aqueous solution containing 20% by weight of sulfamic acid and 40% by weight of urea, drying the wet linters, and heating the dried impregnated linters at 135–140° C. for half an hour.

2. A process for the preparation of cellulose sulfate which comprises impregnating cotton linters with 50 to 300% of its weight of an aqueous solution containing from 10 to 20% by weight of sulfamic acid and 20 to 60% by weight of urea, drying the wet linters, and heating the dried impregnated linters at 130-150° C. for 10 to 30 minutes.

3. A process for the preparation of cellulose sulfate which comprises impregnating cotton linters with 50 to 300% of its weight of an aqueous solution containing from 10 to 20% by weight of sulfamic acid and 20 to 60% by weight of urea, drying the wet linters, and heating the dried impregnated cellulose at a temperature of 110-170° C. for one to sixty minutes.

4. A process for the preparation of cellulose sulfate which comprises impregnating cellulose with an excess of an aqueous solution containing from 10 to 20% by weight of sulfamic acid and from 20 to 60% by weight of urea, said solution containing from one to three parts of urea per part of sulfamic acid, removing the aqueous solution in excess of 50 to 300% of the weight of dry cellulose, drying the wet cellulose, and heating the dried impregnated cellulose at 110-170° C. for one to sixty minutes.

5. A process for the preparation of cellulose sulfate which comprises impregnating cellulose with at least 50%, by weight of the cellulose, of an aqueous solution containing from 10 to 20% by weight of sulfamic acid and from 20 to 60% by weight of a water-soluble amide of a carboxylic acid, drying the wet, impregnated cellulose, and heating the dried impregnated cellulose at a temperature of at least 110° C.

JOHN CUNNINGHAM THOMAS.

REFERENCES CITED

The following references are of record in the file of this patent:

UNITED STATES PATENTS

| Number | Name | Date |
|---|---|---|
| 2,089,697 | Groebe | Aug. 10, 1937 |
| 2,142,115 | Cupery | Jan. 3, 1939 |
| 2,142,116 | Cupery | Jan. 3, 1939 |
| 2,174,534 | Schipp | Oct. 3, 1939 |
| 2,212,152 | Cupery | Aug. 20, 1940 |
| 2,286,726 | Gordon | June 16, 1942 |
| 2,422,730 | Hoffman | June 24, 1947 |

OTHER REFERENCES

Little "Flameproofing Textile Materials," Reinhold Publishing Corp., New York, 1947, pp. 181-217.